Dec. 24, 1929. W. E. COLLETTE 1,740,498
FASTENING INSERTING MACHINE
Filed July 16, 1927
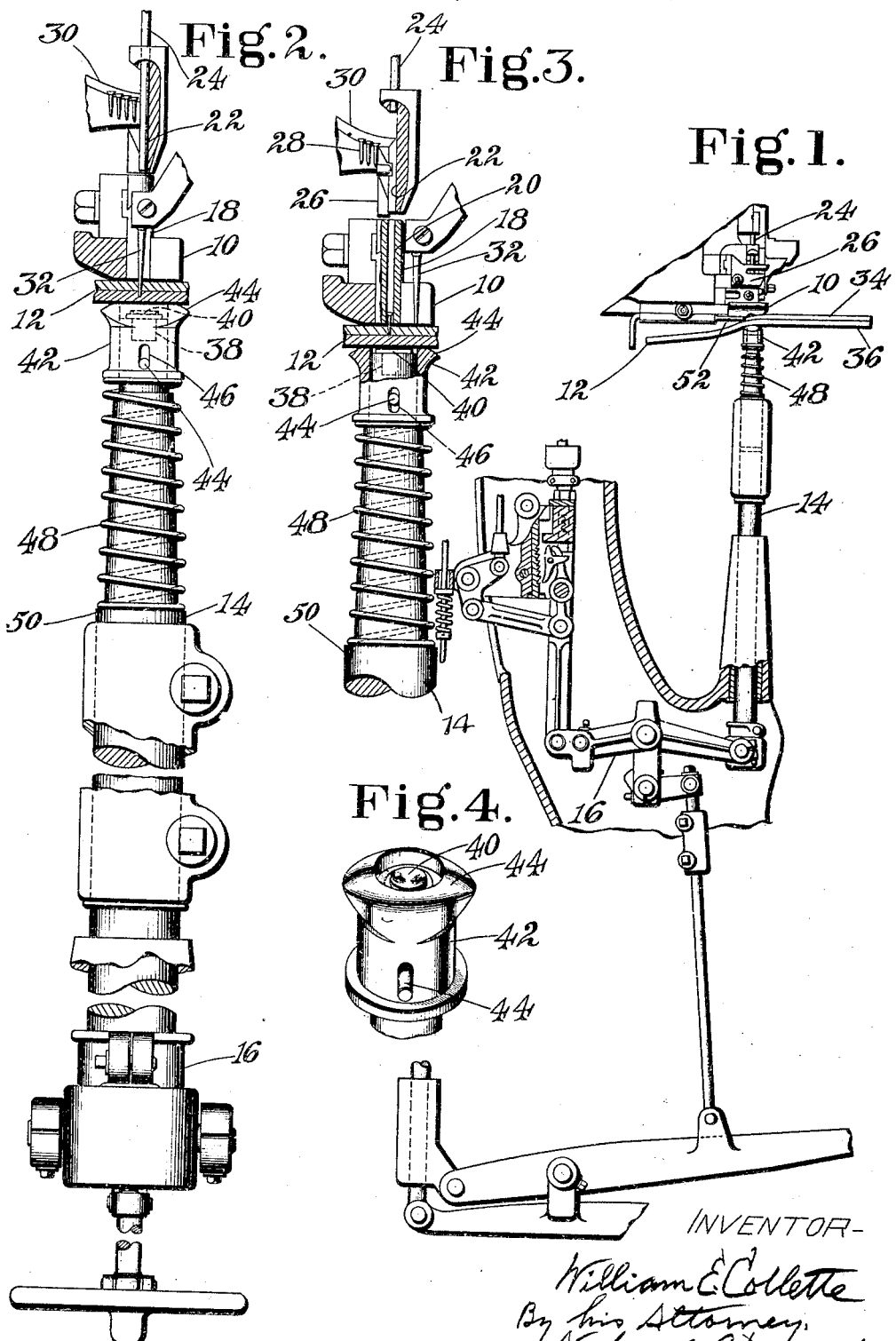
INVENTOR-
William E Collette
By his Attorney,
Nelson W. Howard Patented Dec. 24, 1929

1,740,498

UNITED STATES PATENT OFFICE

WILLIAM E. COLLETTE, OF MARLBORO, MASSACHUSETTS, ASSIGNOR TO UNITED SHOE MACHINERY CORPORATION, OF PATERSON, NEW JERSEY, A CORPORATION OF NEW JERSEY

FASTENING-INSERTING MACHINE

Application filed July 16, 1927. Serial No. 206,216.

This invention relates to fastening inserting machines and is illustrated as embodied in a nailing machine of the type disclosed in Letters Patent of the United States No. 1,011,941, granted December 19, 1911, on an application of George Goddu, the illustrated machine having improved means for controlling the work to prevent damage to or inadvertent displacement of the work as it is fed between the insertion of successive fastenings.

The work supports of fastening inserting machines of a number of well-known types, of which that referred to furnishes an example, are operative to press or clamp a work piece carried by the work support firmly against a presser plate or abutment during the insertion of each fastening and to relieve the pressure upon the work piece while the work piece is fed between the insertion of successive fastenings. The pressure-relieving movement of the work support may amount to as much as a quarter of an inch or thereabouts, and in operating upon some kinds of work pieces there is consequently danger of the displacement of the work piece while the pressure is relieved. In other machines, usually where a lighter pressure is used, the pressure is not relieved during the feeding movement. For some purposes this is entirely satisfactory, but when fastenings are driven completely through the work piece and are clenched against an anvil carried by the work support there is danger of the surface of the work being marred by the anvil during the feeding movement.

It is an object of the present invention so to organize a fastening inserting machine that the work piece operated upon will be held during the feeding movement of the work between the insertion of successive fastenings in such a manner that there will be no danger of undesired displacement of the work piece and no possibility of the work piece being damaged by rubbing against the clenching anvil during the feeding movement of the work.

With this in view, an important feature of the invention comprises the provision of means arranged to hold a work piece relatively lightly against the abutment when pressure is relieved during the work feeding movement, thereby permitting ready work feeding and at the same time insuring against displacement of the work. Moreover, as the clenching anvil, if one there be, carried by the work support, moves downwardly as the pressure is relieved, it no longer engages the surface of the work piece and cannot scrape or mar the surface of the work piece as the feeding takes place.

As illustrated, the work support is provided with a sleeve surrounding its clenching anvil, which sleeve is mounted for limited movement lengthwise of the work support, (for example, by a pin-and-slot connection) and is pressed by a relatively light spring toward the work, the spring being stiff enough, however, to hold the work piece out of engagement with the clenching anvil when the latter is moved away from the abutment or presser plate of the machine during the feeding movement.

With the above and other objects and features in view, the invention will now be described in connection with the accompanying drawings, and pointed out in the claims.

In the drawings,

Fig. 1 is a side elevation of a fragment of the head, the work support and part of the work support controlling mechanism of a fastening inserting machine embodying the present invention;

Fig. 2 is a front view of the work support together with a part of the controlling means and the fastening inserting instrumentalities of the machine on a larger scale than Fig. 1, showing the work support in the position it assumes relatively to the work when the pressure is relieved during the work feeding movement;

Fig. 3 is a front view of the work support partly in section together with the fastening inserting instrumentalities of the machine showing the work support in the position relatively to the work which it occupies at the time of the insertion of a fastening; and Fig. 4 is a perspective view of the work-engaging portion of the work support.

The invention is illustrated herein as embodied in a nailing machine of the type disclosed in said Letters Patent of the United States No. 1,011,941. Additional details of a machine of this type are disclosed in Letters Patent of the United States No. 1,030,775, granted June 25, 1912, on another application of said Goddu. The nature of the present invention is such that it is unnecessary to illustrate a complete fastening inserting machine in order completely to disclose the invention. Reference, accordingly, may be had to the two patents above identified for a full disclosure of such a machine.

The illustrated machine is provided with a presser plate or abutment 10 against which the work piece 12 is pressed by the work support, indicated generally at 14, during the insertion of the fastenings, the pressure being relieved during the feeding of the work between the insertion of successive fastenings. As illustrated, the pressure applying and relieving movements of the work support are brought about by mechanism indicated generally at 16 (Fig. 1) and of the character disclosed in said Letters Patent of the United States No. 1,011,941.

As shown in Letters Patent of the United States No. 1,030,775, the machine is provided with a throat member 18 (Fig. 3) having a throat opening 20 which, at the time of insertion of a fastening, is moved into line with a driver passage 22 through which reciprocates a driver 24. A separator 26 is arranged to control the passage of nails 28 from a raceway 30 to the driver passage. An awl 32, operating in timed relation to the throat member 18, the driver 24, and the separator 26, moves downwardly from a position shown in Fig. 3 to penetrate the work, then to the left to a position shown in Fig. 2 to feed the work, and finally upwardly and rearwardly to permit the movement of the throat member 18 into alinement with the driver guide 22 for the insertion of a fastening.

The controlling mechanism 16 is arranged to press the work support 14 upwardly so as to hold the work against the presser plate 10 of the machine at the time of the insertion of each fastening, and to move the work support 14 downwardly so as to relieve the pressure upon the work while the work is fed by the awl 32 between the insertion of successive fastenings. In the illustrated machine, which is shown as nailing the butt of a half sole or tap 34 to an outsole 36, the entering ends of the nails are clenched on the under side of the work against an anvil 38, the upper surface of which is formed as a clenching cavity 40. To prevent undesired displacement of the work when the pressure is relieved during the feeding movement, and at the same time to insure against damage to the lower surface of the work by the anvil during the feeding movement, the upper portion of the work support 14 is surrounded by a sleeve 42 having a convex work-engaging upper surface 44. The sleeve 42 is mounted for sliding movement endwise of the upper end of the work support 14. The extent of such sliding movement is limited by a pin 44 carried by the work support, and engaged in a slot 46 formed in the sleeve 42. A coiled spring 48 surrounding the work support and bearing at its upper end against the sleeve 42 and at its lower end upon a shoulder 50 carried by the work support 14 tends to urge the sleeve 42 upwardly to the position shown in Fig. 2 in which the top surface 44 of the sleeve is positioned somewhat above the top of the anvil 38. When the work support 14 is moved downwardly to relieve the pressure during the feeding movement, the work piece is held lightly against the abutment 10 of the machine by the spring 48 with a force insufficient to interfere with the feeding of the work, and in such a position that the upper surface of the anvil 40 is out of contact with the work. Thus the work piece can be fed by the awl 32, being guided by a gage 52 (Fig. 1), without danger of displacement of the work piece or of damage by the anvil 38.

Having thus described my invention, what I claim as new and desire to secure by Letters Patent of the United States is:—

1. A fastening inserting machine having an abutment, a work support in opposed relation to the abutment, pressure-controlling mechanism arranged to press a work piece carried by the work support against the abutment during the insertion of fastenings and to relieve the pressure upon the work piece while the work piece is fed between the insertion of successive fastenings, and means to hold the work piece lightly against the abutment when the pressure is relieved.

2. A fastening inserting machine having an abutment, a work support in opposed relation to the abutment, pressure-controlling mechanism arranged to press a work piece carried by the work support against the abutment during the insertion of fastenings and to relieve the pressure upon the work piece while the work piece is fed between the insertion of successive fastenings, and means separate and independent from said pressure-controlling means arranged to hold the work piece lightly against the abutment when the pressure is relieved.

3. A fastening inserting machine having an abutment, a work support in opposed relation to the abutment, fastening inserting means, an awl operable to feed a work piece upon the support between the insertion of successive fastenings, pressure-controlling mechanism arranged to press the work piece carried by the work support against the abutment during the insertion of fastenings and to relieve the pressure upon the work piece while the work piece is fed between the insertion of successive fastenings, and a member carried by the work support separate and independent from said pressure-controlling means arranged to hold the work piece lightly against the abutment when the pressure is released.

4. A fastening inserting machine having means for inserting fastenings in a work piece presented thereto, an abutment, a work support arranged to press the work piece against the abutment during the insertion of each fastening and to release the pressure during feeding movement between the insertion of successive fastenings, an anvil carried by the work support and arranged to clench the fastenings inserted, and means arranged to hold the work piece out of contact with the anvil during the feeding movement between the insertion of successive fastenings.

5. A fastening inserting machine having means for inserting fastenings in a work piece presented thereto, work-engaging means operable to feed the work piece past the fastening inserting means, an abutment, a work support arranged to press the work piece against the abutment during the insertion of each fastening and to release the pressure during the feeding movement between the insertion of successive fastenings, an anvil carried by the work support and arranged to clench the fastenings inserted, and means carried by the work support arranged to hold the work piece lightly against the abutment and out of contact with the anvil when the pressure of the work support is released during the feeding movement.

6. A fastening inserting machine having means for inserting fastenings in a work piece presented thereto, work-engaging means operable to feed the work piece past the fastening inserting means, an abutment, a work support arranged to press the work piece against the abutment during the insertion of each fastening and to release the pressure during feeding movement between the insertion of successive fastenings, an anvil carried by the work support and arranged to clench the fastenings inserted, a sleeve surrounding the anvil and capable of limited movement in the direction of the line of drive of fastenings inserted by the machine, and a spring urging said sleeve toward the work piece with sufficient strength to support the work piece out of contact with the anvil when pressure of the anvil aganst the work piece is released.

7. A work support for a fastening inserting machine having a fastening clenching anvil, a sleeve surrounding the anvil capable of limited movement in the direction of the line of drive of the fastenings inserted by the machine and so positioned that it is not touched by the fastenings inserted by the machine, and means urging said sleeve toward the work piece with sufficient strength to support the work piece out of contact with the anvil when pressure of the anvil against the work piece is released.

8. A work support for a fastening inserting machine having a fastening clenching anvil, a sleeve surrounding the anvil capable of limited movement in the direction of the line of drive of the fastenings inserted by the machine and so positioned that it is not touched by the fastenings inserted by the machine, and a spring urging said sleeve toward the work piece with sufficient strength to support the work piece out of contact with the anvil when pressure of the anvil against the work piece is released.

9. A work support for a fastening inserting machine having a fastening clenching anvil, a sleeve having a convex work-engaging surface, said sleeve being connected to the work support by a pin-and-slot connection and surrounding the anvil, and a spring urging the sleeve toward and beyond the anvil, thereby supporting the work piece out of contact with the anvil when pressure of the anvil against the work piece is released.

In testimony whereof I have signed my name to this specification.

WILLIAM E. COLLETTE.